United States Patent
Kono et al.

(10) Patent No.: US 7,438,031 B2
(45) Date of Patent: Oct. 21, 2008

(54) LAYOUT STRUCTURE OF HYDRAULIC CONTROL VALVE FOR VALVE TRAIN IN INTERNAL COMBUSTION ENGINE

(75) Inventors: Naoki Kono, Saitama (JP); Isamu Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 35 days.

(21) Appl. No.: 11/511,329

(22) Filed: Aug. 29, 2006

(65) Prior Publication Data
US 2007/0044744 A1 Mar. 1, 2007

(30) Foreign Application Priority Data
Aug. 31, 2005 (JP) ............................. 2005-251805
Apr. 25, 2006 (JP) ............................. 2006-120503

(51) Int. Cl.
*F01L 9/02* (2006.01)

(52) U.S. Cl. ............ 123/90.12; 123/41.86; 123/196 CP

(58) Field of Classification Search .............. 123/90.12, 123/90.13, 196 CP, 198 F, 198 P, 41.86, 572
See application file for complete search history.

(56) References Cited

U.S. PATENT DOCUMENTS

| | | | | |
|---|---|---|---|---|
| 2,786,457 A | * | 3/1957 | Mickley | 123/41.86 |
| 5,666,915 A | * | 9/1997 | Kawashima et al. | 123/196 R |
| 6,202,610 B1 | * | 3/2001 | Yoshiki et al. | 123/90.15 |

FOREIGN PATENT DOCUMENTS

JP 2002-180812 A 6/2002

* cited by examiner

*Primary Examiner*—Ching Chang
(74) *Attorney, Agent, or Firm*—Birch, Stewart, Kolasch & Birch, LLP

(57) ABSTRACT

To provide a layout structure of a hydraulic control valve for a valve train in an internal combustion engine which can reduce the influence of heat from the cylinders and can avoid the impairment of the external appearance of the internal combustion engine. An internal combustion engine has a valve operation characteristics changing mechanism that changes the operation characteristics of at least one of an intake valve and an exhaust valve. A hydraulic control valve for a valve train controls the pressure of a hydraulic fluid supplied to the valve operation characteristics changing mechanism. The hydraulic control valve is located on the left side surface of right and left crankcases that support and cover a crankshaft at a position below cylinders.

20 Claims, 13 Drawing Sheets

LAYOUT STRUCTURE OF HYDRAULIC CONTROL VALVE FOR VALVE TRAIN IN INTERNAL COMBUSTION ENGINE

CROSS-REFERENCE TO RELATED APPLICATIONS

This nonprovisional application claims priority under 35 U.S.C. §119(a) on patent application Ser. Nos. 2005-251805 and 2006-120503, filed in Japan on Aug. 31, 2005 and Apr. 25, 2006, respectively. The entirety of each of the above-identified applications is incorporated herein by reference.

BACKGROUND OF THE INVENTION

1. Field of the Invention

The present invention relates to a layout structure of a hydraulic control valve for a valve train in an internal combustion engine.

2. Description of Background Art

An internal combustion engine has a valve train that has operation characteristics that can be changed by a hydraulic control valve. A layout structure of the hydraulic control valve is disclosed in Japanese Patent Laid-Open No. 2002-180812, for example.

In Japanese Patent Laid-Open No. 2002-180812, the hydraulic control valve is located in a space below an induction system extending from V-banked cylinder heads of a V-type internal combustion engine toward the inside (valley) of the V bank. Accordingly, the hydraulic control valve does not interfere with any equipment including the induction system, and a hydraulic path can also be reduced.

SUMMARY OF THE INVENTION

However, the space below the induction system of the V-type internal combustion engine is a space defined between V-banked cylinders. The heat from the cylinders directly influences this space. Furthermore, this space is confined both in the vertical direction and in the longitudinal direction (or the lateral direction) of a vehicle that includes the engine mounted therein. Therefore, the heat from the cylinders is prone to stay in this space. Accordingly, when the hydraulic control valve is located in this space, the influence of heat from the cylinders upon the hydraulic control valve is very large. As a result of the influence of heat upon the hydraulic control valve, the accuracy of the valve timing is reduced.

Furthermore, the space between the V-banked cylinders of the V-type internal combustion engine is exposed to the outside of the internal combustion engine, depending on the vehicle. This space is an area where the functional beauty of the cylinders is expressed. Accordingly, when the hydraulic control valve is located in this area, there is a possibility that the external appearance of the internal combustion engine may be impaired.

It is accordingly an object of the present invention to provide a layout structure of a hydraulic control valve for a valve train in an internal combustion engine that can reduce the influence of heat from the cylinders and can avoid the impairment of the external appearance of the internal combustion engine.

According to a first aspect of the present invention, an internal combustion engine has a valve operation characteristics changing mechanism for changing the operation characteristics of at least one of an intake valve and an exhaust valve, and a hydraulic control valve for a valve train for controlling the pressure of a hydraulic fluid to be supplied to the valve operation characteristics changing mechanism. A layout structure of the hydraulic control valve for the valve train in the internal combustion engine is such that the hydraulic control valve is located on a first side surface of a crankcase for supporting and covering a crankshaft at a position below a cylinder.

According to a second aspect of the present invention, the hydraulic control valve is located on the first side surface of the crankcase opposite to a second side surface of the crankcase along which an exhaust pipe is provided.

According to a third aspect of the present invention, a rotating shaft cooperating with the crankshaft is provided in the crankcase, and the hydraulic control valve is located on the first side surface of the crankcase at a position lying on the axis of the rotating shaft.

According to a fourth aspect of the present invention, oil discharged from the hydraulic control valve is returned through an axial hole formed in the rotating shaft into the crankcase.

According to a fifth aspect of the present invention, the internal combustion engine is an OHV type internal combustion engine such that the valve operation characteristics changing mechanism is provided on a second side surface of the crankcase.

According to the first aspect of the present invention, the hydraulic control valve is located on the first side surface of the crankcase for supporting and covering the crankshaft at a position below the cylinder. With this arrangement, the hydraulic control valve is located apart from the cylinder, so that the hydraulic control valve is hardly influenced by the heat from the cylinder. As a result, the hydraulic control valve can be operated properly to thereby maintain accurate valve timing. Furthermore, the hydraulic control valve is located on the first side surface of the crankcase. Therefore, the hydraulic control valve can be covered by any type of cover to avoid the impairment of the external appearance of the internal combustion engine.

According to the second aspect of the present invention, the hydraulic control valve is located on the first side surface of the crankcase opposite to the second side surface of the crankcase along which the exhaust pipe is provided. With this arrangement, the hydraulic control valve is hardly influenced by the heat from the exhaust pipe.

According to the third aspect of the present invention, the hydraulic control valve is located on the first side surface of the crankcase at a position lying on the axis of the rotating shaft. With this arrangement, the rotating shaft can be lubricated by utilizing the oil supplied to the hydraulic control valve.

According to the fourth aspect of the present invention, the oil discharged from the hydraulic control valve is returned through the axial hole of the rotating shaft into the crankcase. With this arrangement, it is not necessary to provide any dedicated oil passage and oil recovery passage for lubrication of the rotating shaft, thereby simplifying a lubricating oil path.

According to the fifth aspect of the present invention, the internal combustion engine is an OHV type internal combustion engine such that the valve operation characteristics changing mechanism is provided on the second side surface of the crankcase. With this arrangement, an oil passage from the hydraulic control valve located on the first side surface of the crankcase to the valve operation characteristics changing mechanism can be shortened.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
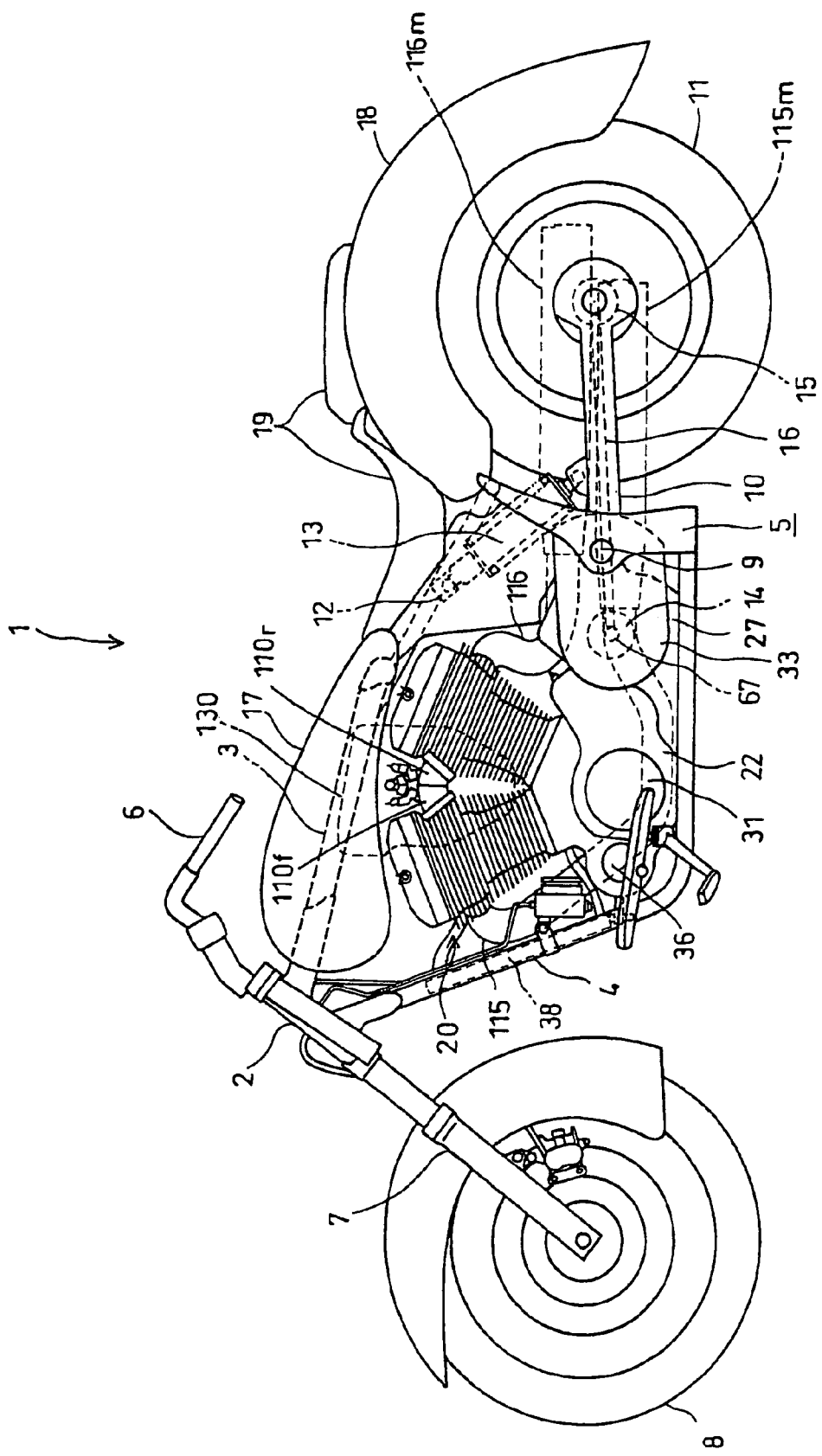
FIG. 1 is a general left side view of a motorcycle according to a preferred embodiment of the present invention.

An embodiment of the present invention will now be described with reference to the accompanying drawings. The same reference numerals will be used to identify the same or similar elements throughout the several views. It should be noted that each of the drawings should be viewed in the direction of orientation of the reference numerals.

A preferred embodiment of the present invention will now be described with reference to FIGS. 1 to 12. FIG. 1 is a general side view of a motorcycle 1 including an internal combustion engine 20 according to a preferred embodiment of the present invention. The motorcycle 1 has a head pipe 2 and a main frame 3 extending rearward from the head pipe 2. A pair of right and left down tubes 4 extend downward from the head pipe 2 below the main frame 3 and further extend rearward from a lower bent portion of the down tubes 4. A radiator 38 is supported between the right and left down tubes 4.

The main frame 3 is bifurcated at an intermediate portion thereof to form a pair of right and left rear portions. A pair of right and left pivot frames 5 are connected between the rear ends of the right and left rear portions of the main frame 3 and the rear ends of the right and left down tubes 4, respectively.

A handle 6 is pivotably supported at a lower end portion thereof to the head pipe 2. The handle 6 extends upward from the head pipe 2 and further extends in the laterally opposite directions of the vehicle. A front fork 7 that is adapted to be steered by the handle 6 extends downward from the head pipe 2. A front wheel 8 is supported on the lower ends of the front fork 7. A rear fork 10 is pivotably supported at a front end thereof through a pivot shaft 9 to the pivot frames 5 so as to be vertically swingable. A rear wheel 11 is supported on the rear ends of the rear fork 10. A pair of right and left brackets 12 are provided on the right and left rear portions of the main frame 3, respectively. Right and left rear cushions 13 are interposed between the right and left brackets 12 and the right and left portions of the rear fork 10, respectively.

The internal combustion engine 20 is mounted in a space surrounded by the main frame 3, the down tubes 4, and the pivot frames 5 so as to be supported at front and rear portions thereof The internal combustion engine 20 has a pair of right and left crankcases 22 joined together. A pair of right and left transmission cases 27 that are joined together are formed on the rear side of the right and left crankcases 22 in an integral manner. A counter shaft 67 projects leftward from the left transmission case 27. A drive gear 14 is fixedly mounted on the counter shaft 27. A driven gear 15 is fixedly mounted on the axle of the rear wheel 11. A drive shaft 16 connects the drive gear 14 and the driven gear 15, thereby transmitting engine power to the rear wheel 11.

A fuel tank 17 is supported on the main frame 3 so as to straddle the main frame 3. A rear fender 18 extends rearward from the upper portions of the pivot frames 5 so as to cover the upper side of the rear wheel 11. A tandem seat 19 is provided between the fuel tank 17 and the rear fender 18 and on the upper side of the rear fender 18.

Figure 2:
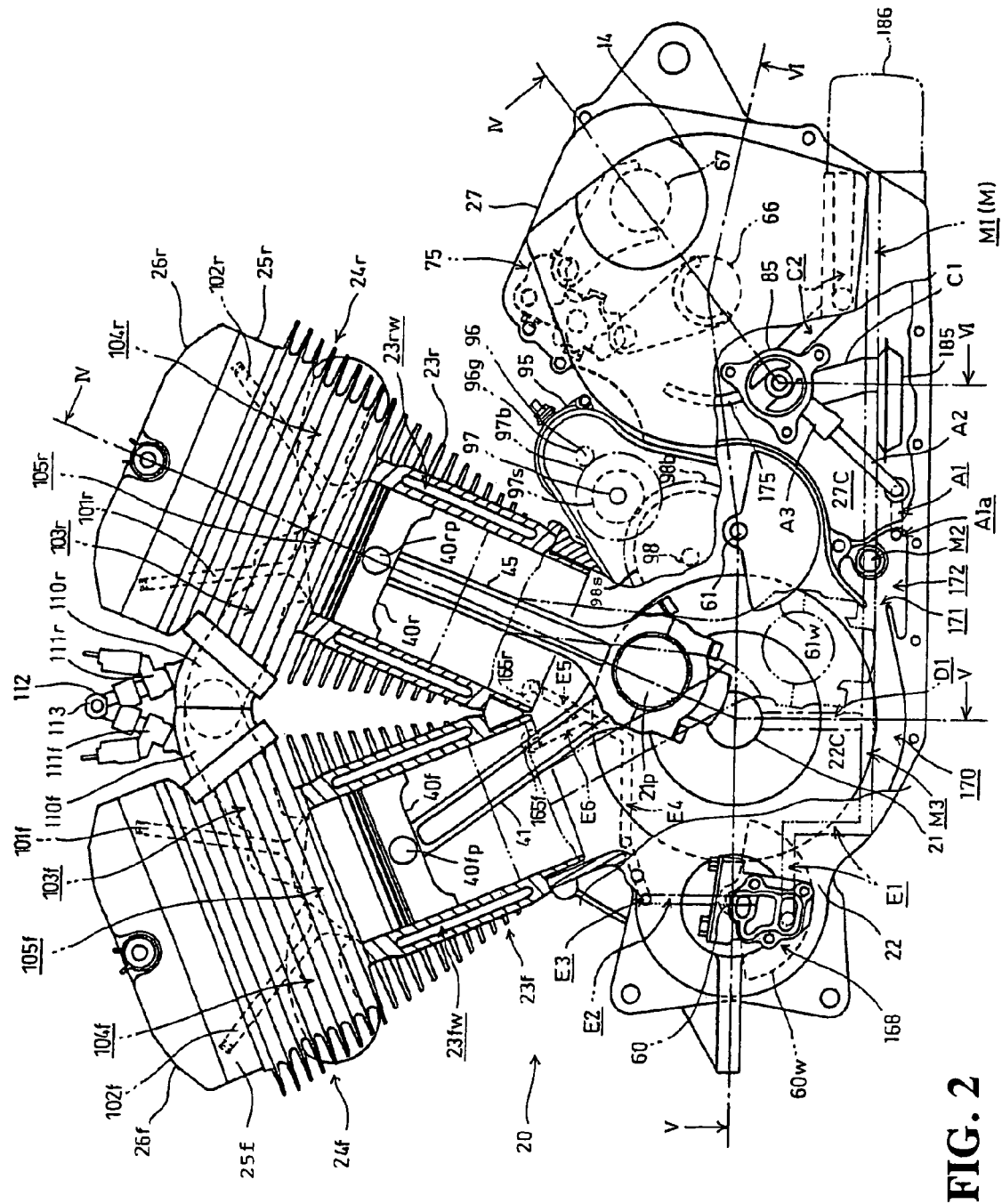
FIG. 2 is a partially sectional, left side view of a V-type internal combustion engine.

The internal combustion engine 20 is a V-type two-cylinder water-cooled four-stroke cycle internal combustion engine such that a crankshaft 21 extends horizontally in the lateral direction of the vehicle and a pair of front and rear bank cylinders 23f and 23r are inclined in the longitudinal direction of the vehicle so as to form a V-shape as viewed in side elevation (see FIG. 2).

The front and rear bank cylinders 23f and 23r extend obliquely upward from the right and left crankcases 22. A pair of front and rear cylinder heads 24f and 24r are joined to the front and rear bank cylinders 23f and 23r, respectively. A pair of front and rear rocker arm holders 25f and 25r are joined to the front and rear cylinder heads 24f and 24r, respectively. A pair of front and rear cylinder head covers 26f and 26r are joined to the front and rear rocker arm holders 25f and 25r, respectively. The front and rear bank cylinders 23f and 23r are formed with water jackets 23fw and 23rw around the respective cylinder bores.

Figure 4:
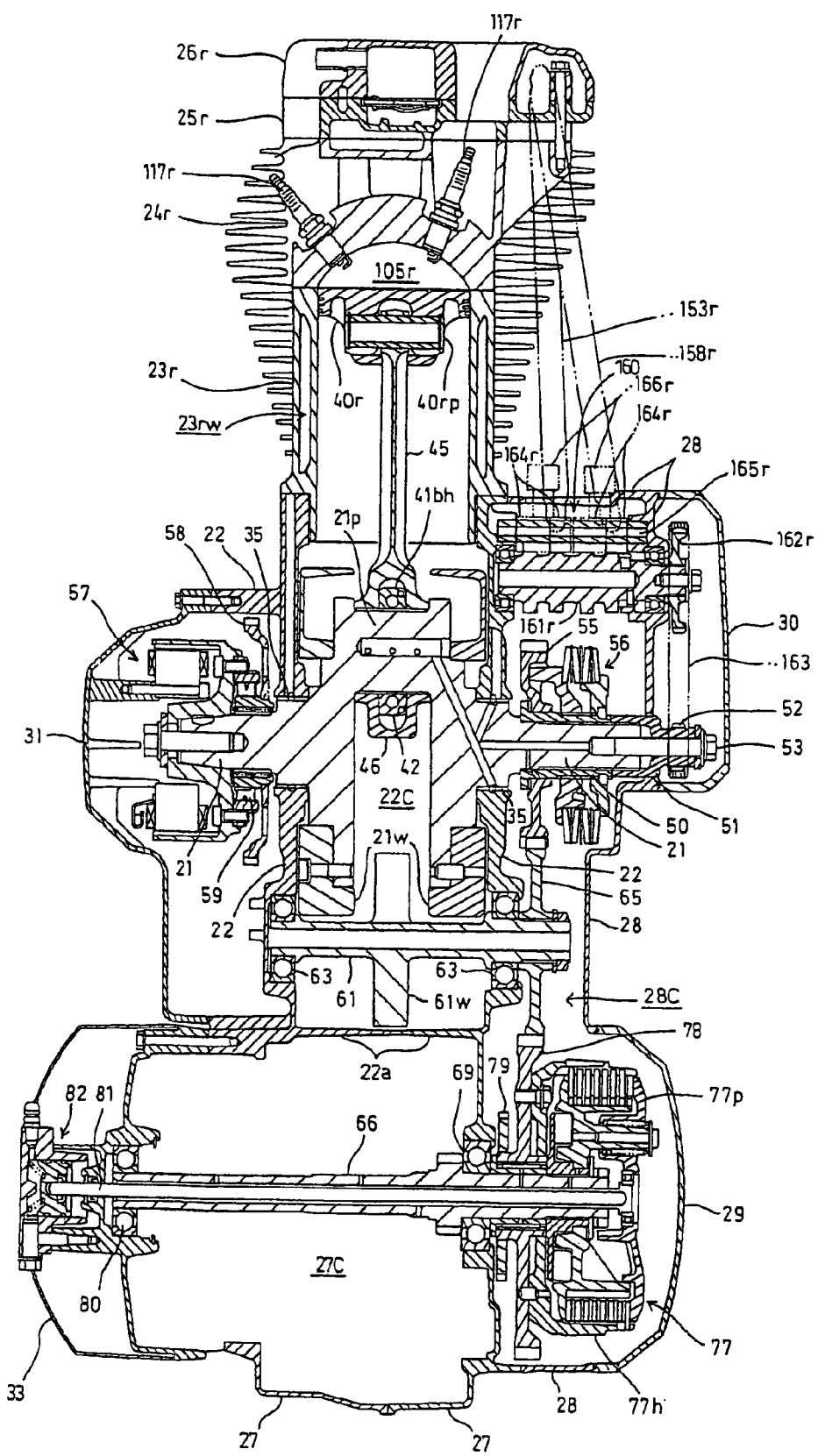
FIG. 4 is a cross section taken along the line IV-IV in FIG. 2.

Referring to FIG. 4, the right and left transmission cases 27 are formed on the rear side of the right and left crankcases 22 in an integral manner with right and left partition walls 22a formed therebetween, respectively. A clutch gear case 28 is connected to the right side of the right crankcase 22 and the right transmission case 27. The clutch gear case 28 has an opening at a rear portion corresponding to the right transmission case 27, and this opening is closed by a clutch cover 29.

Accordingly, a crank chamber 22C is defined by the right and left crankcases 22 and the respective partition walls 22a. A transmission chamber 27C is defined by the right and left transmission cases 27 and the respective partition walls 22a. Furthermore, a clutch chamber 28C is formed so as to be partitioned from the crank chamber 22C and the transmission chamber 27C by the right crankcase 22 and the right transmission case 27 and to be covered by the clutch gear case 28 and the clutch cover 29. A chain cover 30 covers the right side of a side wall of a front portion of the clutch gear case 28. Furthermore, a side cover 36 (see FIG. 1) and an ACG cover 31 are provided to cover the left side of the left crankcase 22. A clutch drive mechanism cover 33 covers the left side of the left transmission case 27.

In the V-type internal combustion engine 20, the cylinder axis of the front bank cylinder 23f and the cylinder axis of the rear bank cylinder 23r lie on the same plane perpendicular to the axis of the crankshaft 21. That is, the front and rear bank cylinders 23f and 23r are not offset from each other in the lateral direction of the vehicle.

A piston 40f having a piston pin 40fp is provided to reciprocate in the front bank cylinder 23f, and a front connecting rod 41 is connected at its small end to the piston pin 40fp of the piston 40f. Similarly, a piston 40r having a piston pin 40rp is provided to reciprocate in the rear bank cylinder 23r, and a rear connecting rod 45 is connected at its small end to the piston pin 40rp of the piston 40r. The big ends of the front and rear connecting rods 41 and 45 are connected to a common crankpin 21p connecting a pair of crank webs 21w of the crankshaft 21.

Figure 9:
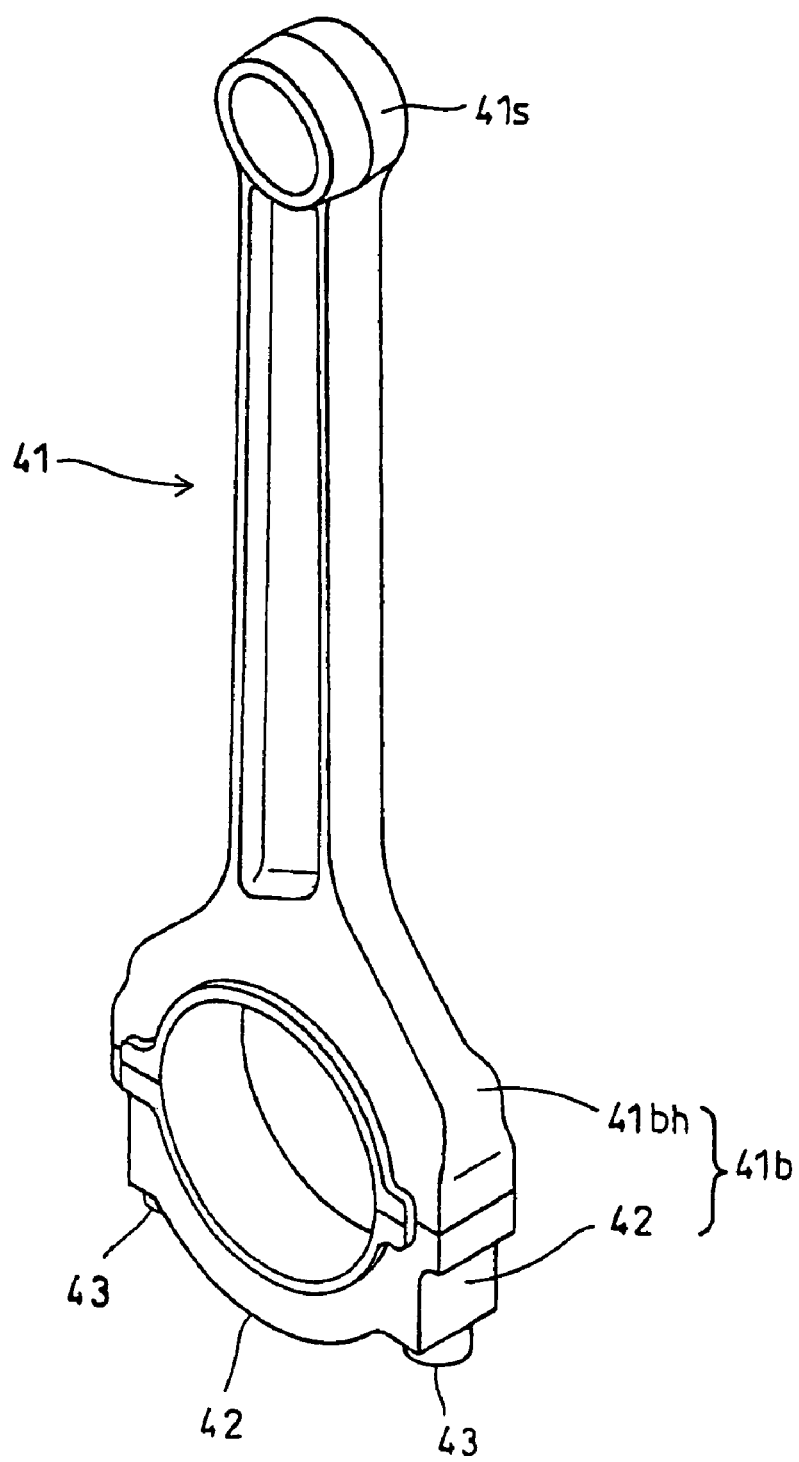
FIG. 9 is a perspective view of a front connecting rod.

As shown in FIG. 9, the front connecting rod 41 has an integral small end 41s and a big end 41b. The big end 41b has a split structure such that it can be split into two parts in a plane perpendicular to the rod axis of the front connecting rod 41. That is, the big end 41b of the front connecting rod 41 is composed of a semicircular rod end portion 41bh and a semicircular connecting rod cap 42 joined to the rod end portion 41bh by means of two connecting rod bolts 43, wherein the crankpin 21p is interposed between the rod end portion 41bh and the connecting rod cap 42.

Figure 10:
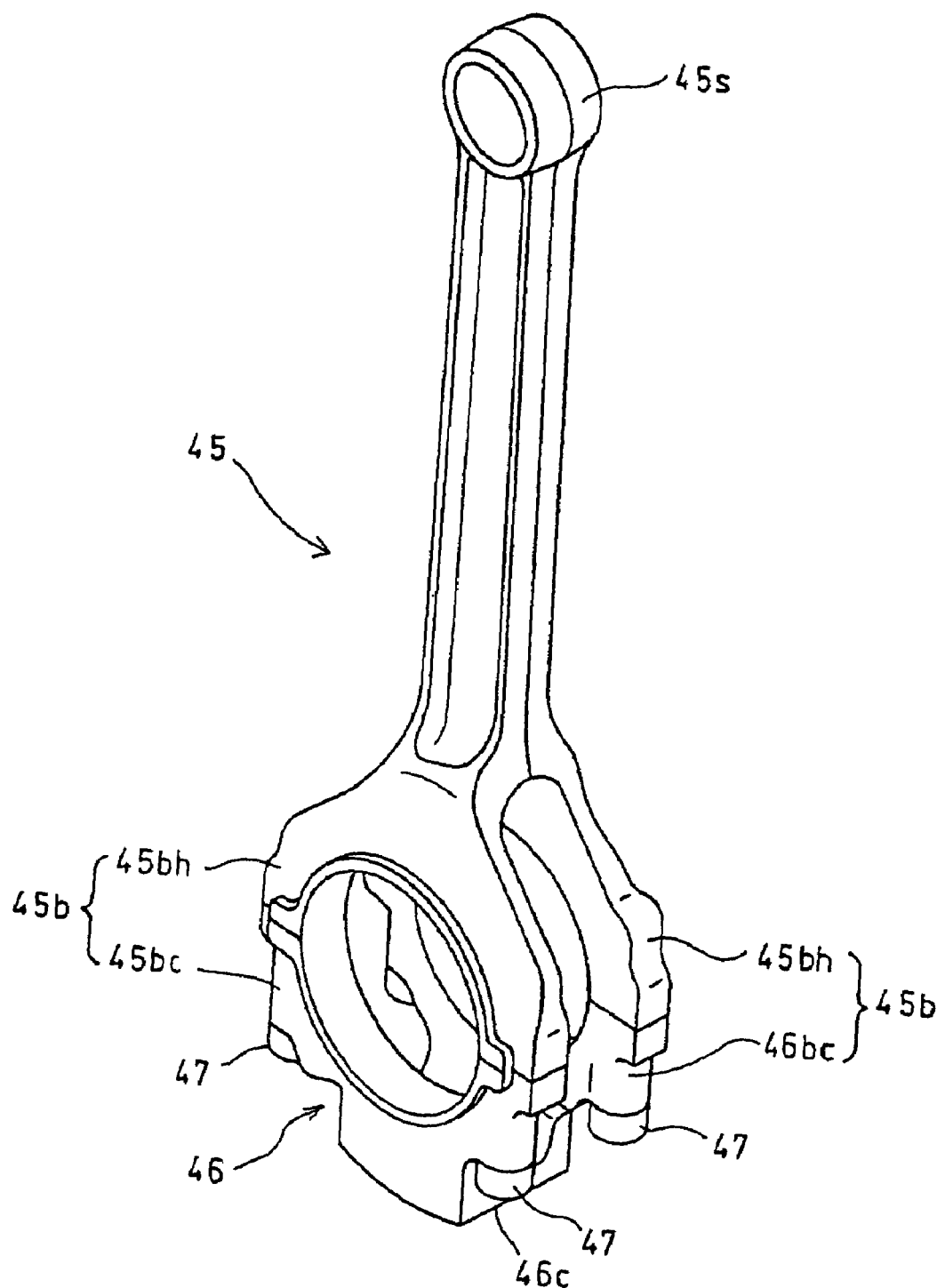
FIG. 10 is a perspective view of a rear connecting rod.
Figure 11:
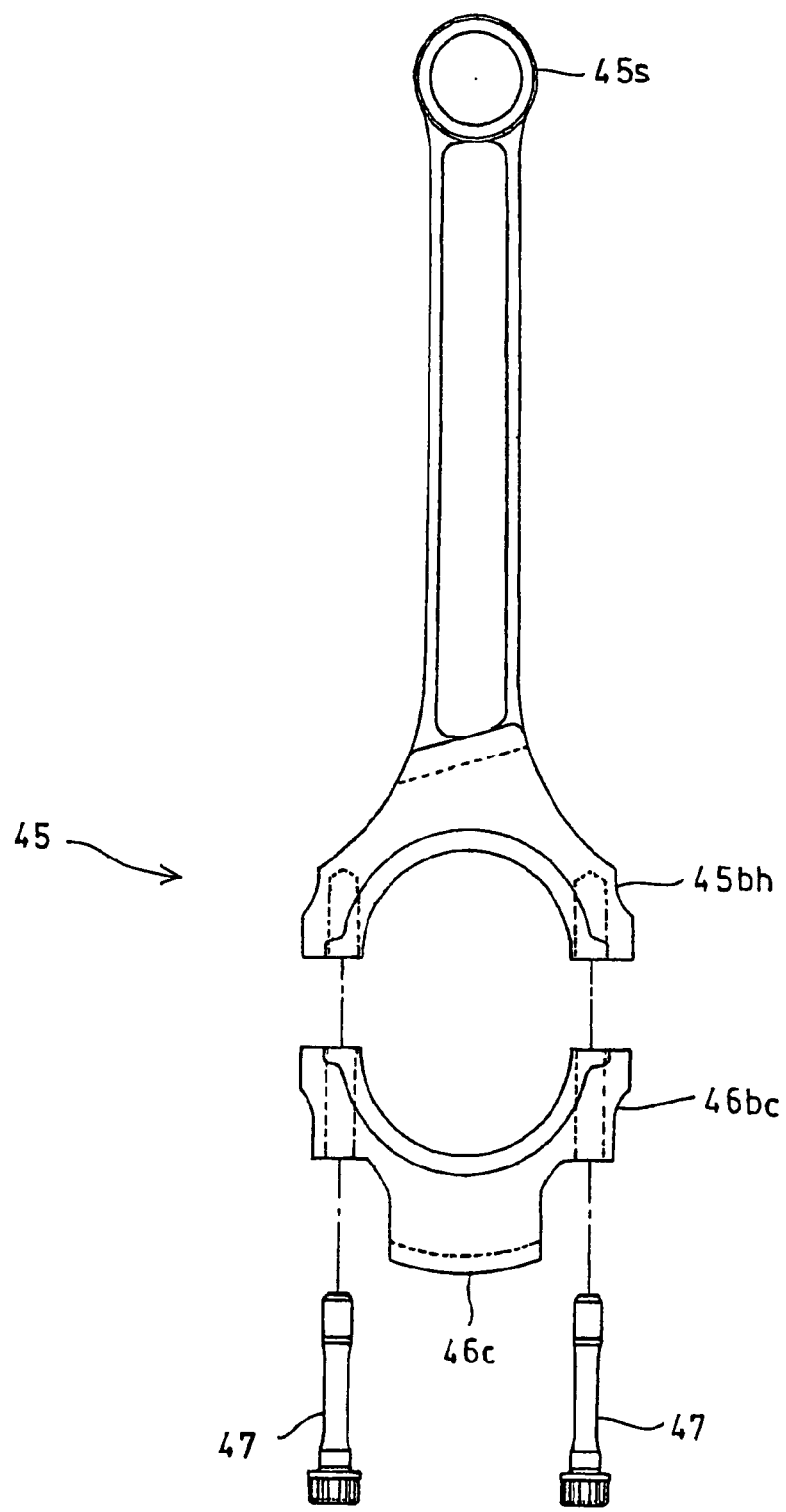
FIG. 11 is an exploded side view of the rear connecting rod.
Figure 12:
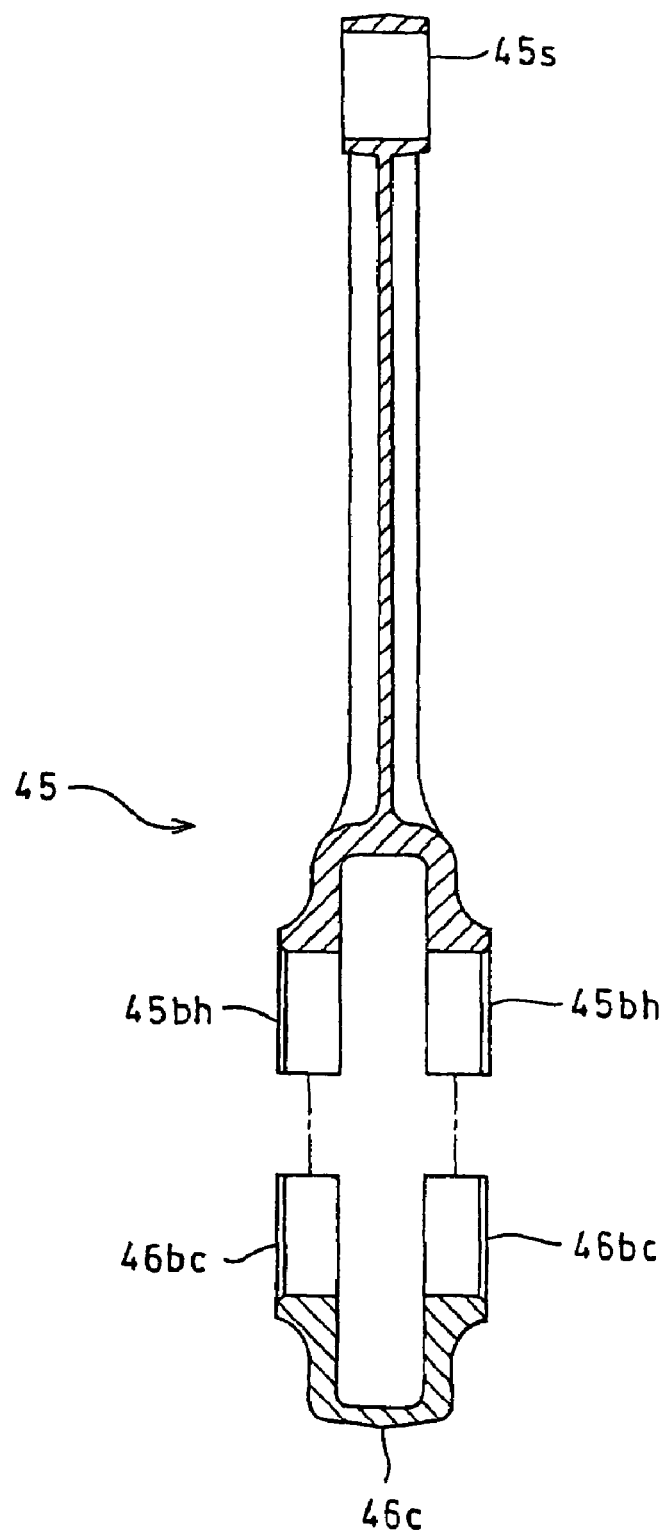
FIG. 12 is an exploded sectional view of the rear connecting rod.

On the other hand, the rear connecting rod 45 is different in shape from the front connecting rod 41 as shown in FIGS. 10 to 12. While the rear connecting rod 45 has an integral small end 45s like the front connecting rod 41, the big end of the rear connecting rod 45 is bifurcated into a pair of big ends 45b opposed to each other. Furthermore, each big end 45b has a split structure such that it can be split into two parts in a plane perpendicular to the rod axis of the rear connecting rod 45.

That is, the pair of big ends 45b of the rear connecting rod 45 are composed of a pair of semicircular rod end portions 45bh opposed to each other and a pair of semicircular portions 46bc joined to the rod end portions 45bh by means of four connecting rod bolts 47. The pair of semicircular portions 46bc project radially outward (in a centrifugal direction) at central portions thereof The projecting portions are connected by a connecting portion 46c, thus forming an integral connecting rod cap 46. That is, the connecting rod cap 46 is composed of the pair of semicircular portions 46bc and the connecting portion 46c connecting these semicircular portions 46bc.

The pair of big ends 45b of the rear connecting rod 45 are supported on the crankpin 21p in such a manner that the crankpin 21p is interposed between the rod end portions 45bh and the connecting rod cap 46. The big end 41b of the front connecting rod 41 is interposed between the big ends 45b of the rear connecting rod 45 in the axial direction of the crankpin 21p (see FIG. 4). In the rear connecting rod 45, the connecting portion 46c of the connecting rod cap 46 that constitutes the pair of big ends 45b projects downward to a large extent (see FIGS. 2 and 8). Thus, the big end 41b of the front connecting rod 41 and the pair of big ends 45b of the rear connecting rod 45 are supported to the common crankpin 21p in such a manner that the big end 41b is interposed between the pair of big ends 45b. With this arrangement, coupling vibrations can be prevented.

In the mounted condition of the pair of big ends 45b of the rear connecting rod 45 and the big end 41b of the front connecting rod 41 to the crankpin 21p, the connecting portion 46c of the connecting rod cap 46 of the rear connecting rod 45 straddles the connecting rod cap 42 of the front connecting rod 41 so as to avoid the interference with each other. Furthermore, the cylinder axes of the front and rear bank cylinders 23f and 23r lie on the same plane perpendicular to the axis of the crankshaft 21. Specifically, the front and rear bank cylinders 23f and 23r are not offset from each other in the lateral direction of the vehicle. Accordingly, the width of the internal combustion engine 20 in the lateral direction of the vehicle can be reduced.

The crankshaft 21 adapted to be rotationally driven through the connection of the front and rear connecting rods 41 and 45 to the common crankpin 21p is supported through a pair of bearings 35 to the right and left crankcases 22. The crankshaft 21 projects rightward into the clutch chamber 28C formed on the right side of the right crankcase 22, and a sleeve 50 is engaged with this projecting portion of the crankshaft 21. Furthermore, a cap 51 with a drive sprocket 52 at an outer end thereof is engaged with the outer end of the projecting portion of the crankshaft 21, and a bolt 53 is tightened to fix the sleeve 50 and the cap 51 together to the projecting portion of the crankshaft 21.

The outer end of the cap 51 with the drive sprocket 52 projects rightward from an opening of the clutch gear case 28. A primary gear 55 is mounted on the sleeve 50, and the rotation of the crankshaft 21 is transmitted through a damper mechanism 56 to the primary gear 55.

The crankshaft 21 projects leftward from the left crankcase 22. An AC generator 57 is provided on the projecting portion of the crankshaft 21. A driven gear 58 in a starting mechanism is mounted through a one-way clutch 59 on the projecting portion of the crankshaft 21.

A pair of front and rear balancer shafts 60 and 61 for canceling primary vibrations are provided at symmetrical positions with respect to the crankshaft 21. The balancer shafts 60 and 61 laterally extend in parallel to the crankshaft 21 in such a manner that the axes of the balancer shafts 60 and 61 lie on the same horizontal plane as that containing the axis of the crankshaft 21, thus constituting a biaxial balancer mechanism.

Figure 5:
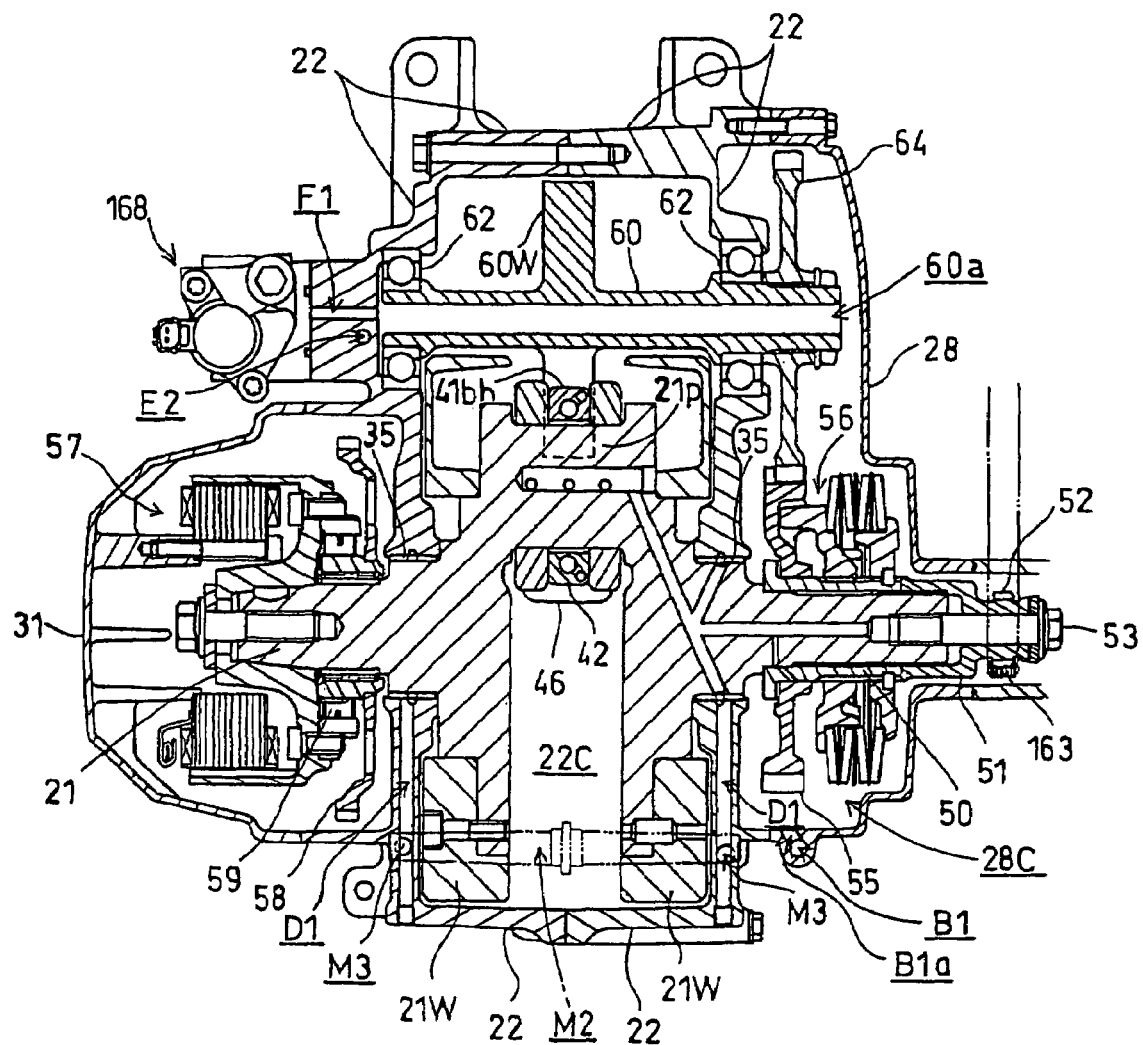
FIG. 5 is a cross section taken along the line V-V in FIG. 2.

The front balancer shaft 60 is rotatably supported through bearings 62 to the right and left crankcases 22 (see FIG. 5). The rear balancer shaft 61 is also rotatably supported through bearings 63 to the right and left crankcases 22 (see FIG. 4). The balancer shafts 60 and 61 respectively have balancer weights 60w and 61w, which are adapted to rotationally pass through the space between the pair of crank webs 21w of the crankshaft 21.

The balancer shafts 60 and 61 project through the respective right bearings 62 and 63 fitted to the right crankcase 22 into the clutch chamber 28C. A pair of front and rear balancer gears 64 and 65 are mounted on the right projecting end portions of the balancer shafts 60 and 61, respectively. The front and rear balancer gears 64 and 65 mesh with the primary gear 55 mounted on the crankshaft 21. Each of the balancer gears 64 and 65 has the same diameter as that of the primary gear 55, so that the balancer shafts 60 and 61 are rotated at the same speed as that of the crankshaft 21 in concert with the rotation of the crankshaft 21 in a direction opposite to the rotational direction of the crankshaft 21.

A main shaft 66 and a counter shaft 67 are supported to the right and left transmission cases 27 on the rear side of the rear balancer shaft 61. The counter shaft 67 is located on the rear upper side of the main shaft 66, and is supported at its opposite ends through bearings to the right and left transmission cases 27. A gear shift mechanism 75 is located above the main shaft 66. The left end of the counter shaft 67 projects from the transmission chamber 27C. The drive gear 14 is mounted on the left projecting end of the counter shaft 67.

The right end of the main shaft 66 projects from the transmission chamber 27C, and a multiplate clutch 77 is provided in the right projecting end of the main shaft 66. The multiplate clutch 77 has a clutch housing 77h rotatably supported to the main shaft 66 and a main gear 78 integrated with the clutch housing 77h. The main gear 78 meshes with the balancer gear 65 mounted on the rear balancer shaft 61. An oil pump gear 79 is also integrated with the main gear 78.

A clutch operating shaft 81 extends through an axially extending center hole of the main shaft 66. The right end of the clutch operating shaft 81 is connected to a pressure plate 77p of the multiplate clutch 77. The left end of the clutch operating shaft 81 is inserted in a clutch drive mechanism 82 provided in the clutch drive mechanism cover 33. Accordingly, when the crankshaft 21 is rotated during the operation of the internal combustion engine 20, the primary gear 55 is rotated through the damper mechanism 56. The rotation of the primary gear 55 is transmitted through the front and rear balancer gears 64 and 65 meshing with the primary gear 55 to the front and rear balancer shafts 60 and 61.

The rotation of the rear balancer gear 65 is transmitted to the main gear 78 meshing with the rear balancer gear 65, thereby rotating the clutch housing 77h of the multiplate clutch 77. When the multiplate clutch 77 is engaged, the rotation of the clutch housing 77h is transmitted to the main shaft 66.

The meshing of gears on a main gear train and on a counter gear train is selectively effected by the gear shift mechanism 75. The rotation of the main shaft 66 is transmitted through the selected gear pair to the counter shaft 67. The rotation of the counter shaft 67 is transmitted through the drive gear 14 mounted on the counter shaft 67 and through the drive shaft 16 to the driven gear 15, thereby rotationally driving the rear wheel 11. An oil pump 85 is located on the front lower side of the main shaft 66 in the transmission chamber 27C (see FIG. 2).

Figure 6:
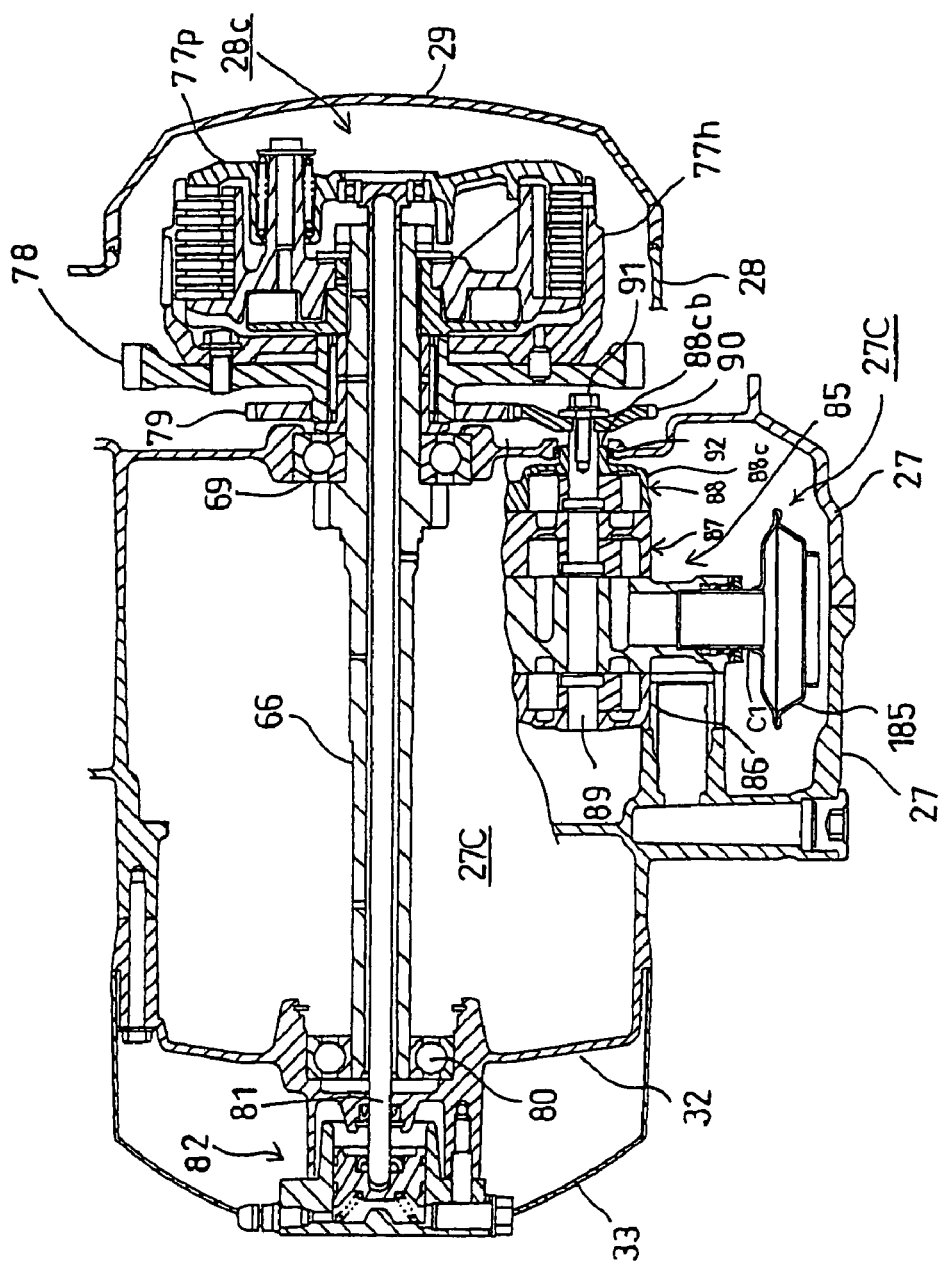
FIG. 6 is a cross section taken along the line VI-VI in FIG. 2.

As shown in FIG. 6, the oil pump 85 is composed of a crank chamber scavenging pump 86, a feed pump 87, and a clutch chamber scavenging pump 88 arranged in this order from the left side. The inner rotors in these pumps 86, 87, and 88 are mounted on a common rotating shaft 89 extending in the lateral direction of the vehicle.

The clutch chamber scavenging pump 88 has a pump case 88c. A bearing portion 88cb is formed at the center of the right side wall of the pump case 88c. The bearing portion 88cb of the pump case 88c projects rightward to be inserted into a circular hole of the right transmission case 27. The right end of the rotating shaft 89 is inserted through the bearing portion 88cb to project into the clutch chamber 28C. A pump drive gear 90 is fixed to the right projecting end of the rotating shaft 89 by a bolt 91. The pump drive gear 90 meshes with the oil pump gear 79. Accordingly, the rotation of the crankshaft 21 is transmitted through the primary gear 55 and the balancer gear 65 to the main gear 78, thereby rotating the oil pump gear 79 integrated with the main gear 78. As a result, the pump drive gear 90 meshing with the oil pump gear 79 is rotated to thereby drive the oil pump 85.

The bearing portion 88cb inserted from the transmission chamber 27C into the circular hole of the right transmission case 27 is sealed by an oil seal 92 interposed between the outer circumference of the bearing portion 88cb and the inner circumference of the circular hole, thus making the seal between the transmission chamber 27C and the clutch chamber 28C (see FIG. 6).

A starter motor 95 is located behind a joining portion between the crankcases 22 and the rear bank cylinder 23r. A drive shaft 96 of the starter motor 95 projects leftward. As shown in FIG. 2, the drive shaft 96 is formed with a drive gear 96g, which meshes with a large-diameter gear 97b on a reduction gear shaft 97. A small-diameter gear 97s on the reduction gear shaft 97 meshes with a large-diameter intermediate gear 98b on an intermediate shaft 98. A small-diameter intermediate gear 98s on the intermediate shaft 98 meshes with the driven gear 58 on the crankshaft 21.

Accordingly, the rotation of the drive shaft 96 of the starter motor 95 is transmitted through the drive gear 96g, the large-diameter gear 97b, the small-diameter gear 97s, the large-diameter intermediate gear 98b, the small-diameter intermediate gear 98s to the driven gear 58 in this order, thereby rotationally driving the crankshaft 21 through the one-way clutch 59 and thus starting the internal combustion engine 20.

An intake and exhaust system will now be described. The internal combustion engine 20 is of an OHV (overhead valve) type such that intake valves 101f and 101r and exhaust valves 102f and 102r are provided in the cylinder heads 24f and 24r, respectively. A valve operating cam mechanism 160 is provided on the right crankcase 22. The intake valves 101f and 101r are provided so that they can open and close openings of intake ports 103f and 103r formed in the cylinder heads 24f and 24r to combustion chambers 105f and 105r, respectively. Similarly, the exhaust valves 102f and 102r are provided so that they can open and close openings of exhaust ports 104f and 104r formed in the cylinder heads 24f and 24r to the combustion chambers 105f and 105r, respectively.

As shown in FIG. 4, two spark plugs 117r are mounted in the cylinder head 24r so as to be exposed to the combustion chamber 105r. Although not shown, two spark plugs are similarly mounted in the cylinder head 24f so as to be exposed to the combustion chamber 105f.

In the front cylinder head 24f, the intake port 103f extends rearward from the combustion chamber 105f to an intake pipe 110f provided in the space between the front and rear cylinder heads 24f and 24r (see FIG. 2). The exhaust port 104f extends frontward from the combustion chamber 105f to an exhaust pipe 115 (see FIG. 1).

On the other hand, in the rear cylinder head 24r, the intake port 103r extends frontward from the combustion chamber 105r to an intake pipe 110r provided in the space between the front and rear cylinder heads 24f and 24r (see FIG. 2). The exhaust port 104r extends rearward from the combustion chamber 105r to an exhaust pipe 116 (see FIG. 1).

Figure 7:
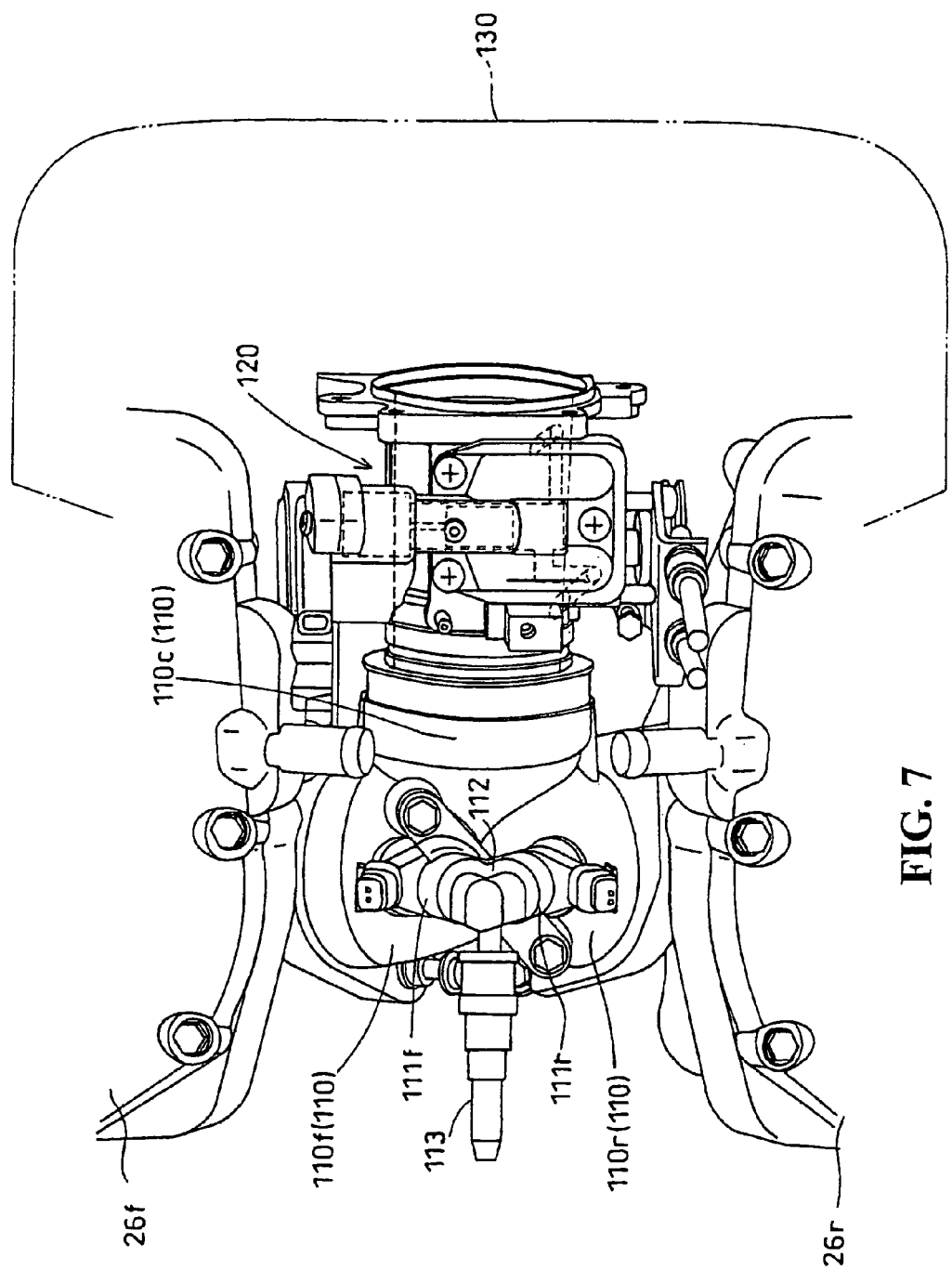
FIG. 7 is a top plan view of an inside portion of the V bank.

As shown in FIG. 7, the intake pipe 110f extending rearward from the front cylinder head 24f and the intake pipe 110r extending frontward from the rear cylinder head 24r are joined together at the center of the space between the front and rear cylinder heads 24f and 24r, and further joined to an upstream intake pipe 110c extending rightward. Thus, the intake pipes 110f and 110r and the upstream intake pipe 110c are joined together to constitute an integral intake pipe 110. In other words, the intake pipes 110f and 110r are branch pipes of the intake pipe 110.

A throttle body 120 is connected to the upstream end of the upstream intake pipe 110c. An air cleaner 130 is located upstream of the throttle body 120 on the right side thereof. The air cleaner 130 is provided so as to cover the space between the front and rear banks on the right side thereof along the right side surfaces of the front and rear cylinders 23f and 23r, the cylinder heads 24f and 24r, and the cylinder head covers 26f and 26r.

A pair of fuel injection valves 111f and 111r are respectively mounted on the intake pipes 110f and 110r so as to project obliquely upward. The upper ends of the fuel injection valves 111f and 111r are engaged in a common socket 112. A connection pipe 113 projects leftward from the socket 112. A fuel pipe (not shown) is connected to the connection pipe 113.

As shown in FIG. 1, the exhaust pipe 115 extends frontward from the front cylinder head 24f and then bends downward to extend rearward along the right side surface of the right crankcase 22. The downstream end of the exhaust pipe 115 is connected to a muffler 115m extending along the right side of the rear wheel 11 in the longitudinal direction of the vehicle. Furthermore, the exhaust pipe 116 extends rearward from the rear cylinder head 24r and then bends downward to extend rearward along the right side surface of the right transmission case 27. The downstream end of the exhaust pipe 116 is connected to a muffler 116m extending along the right side of the rear wheel 11 above the muffler 115m in parallel relationship thereto.

Figure 3:
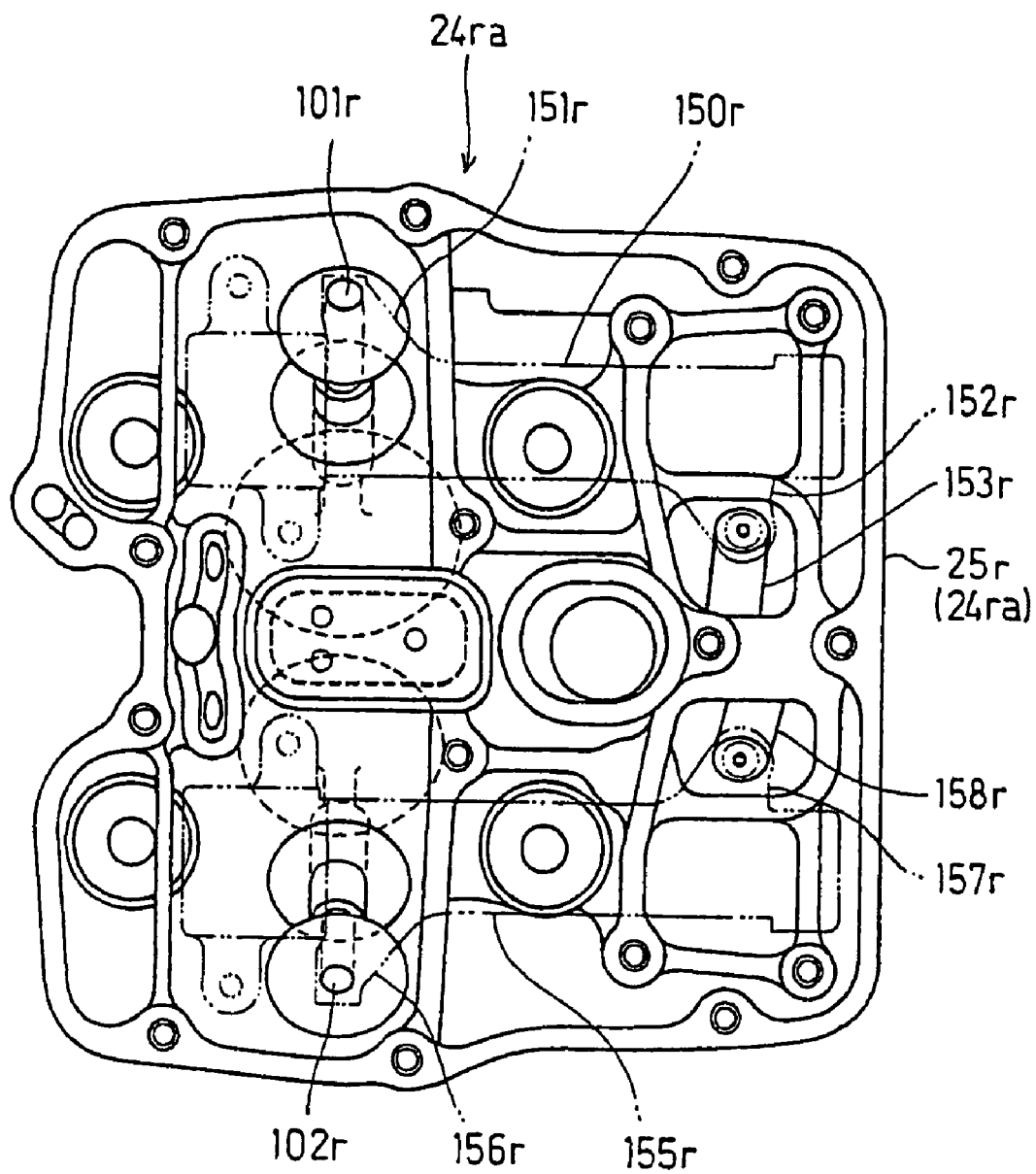
FIG. 3 is a top plan view of a rear cylinder head portion.

The valve train mechanism will now be described. Referring to FIG. 3, there is shown a top plan view of a rear cylinder head portion 24ra. The rocker arm holder 25r is mounted on the upper surface of the cylinder head 24r including the above-mentioned intake and exhaust system. The rocker arm holder 25r rotatably holds an intake rocker arm shaft 150r and an exhaust rocker arm shaft 155r inside the cylinder head cover 26r.

Referring to FIGS. 3 and 4, a rocker arm 151r for operating the intake valve 101r and a rocker arm 152r adapted to be operated by an intake push rod 153r are mounted on the intake rocker arm shaft 150r at the inner position in the rear bank. Similarly, a rocker arm 156r for operating the exhaust valve 102r and a rocker arm 157r adapted to be operated by an exhaust push rod 158r are mounted on the exhaust rocker arm shaft 155r at the outer position in the rear bank.

The upper ends of the intake push rod 153r and the exhaust push rod 158r are in abutment against the rocker arms 152r and 157r in the cylinder head cover 26r, respectively. The lower ends of the intake and exhaust push rods 153r and 158r are in cooperative engagement with the valve operating cam mechanism 160 provided in the clutch gear case 28 on the right side of the right crankcase 22. The elongated stem portions of the intake and exhaust push rods 153r and 158r except their upper and lower ends extend along the right side surfaces of the cylinder 23r and the cylinder head 24r.

Thus, the valve train in this preferred embodiment is of an OHV type such that the valve operating cam mechanism 160 is provided on the right side of the right crankcase 22 and the intake valve 101r and the exhaust valve 102r provided in the cylinder head 24r are operated by the valve operating cam mechanism 160 through the push rods 153r and 158r, respectively. Although not shown, a similar structure is provided for the front cylinder head 24f.

The valve operating cam mechanism 160 in the clutch gear case 28 includes a camshaft 161f (not shown) for the front bank and a camshaft 161r for the rear bank located above the right end portion of the crankshaft 21. The camshafts 161f and 161r are rotatably supported to the right crankcase 22 and the clutch gear case 28 so as to extend in parallel to the crankshaft 21.

As shown in FIG. 4, the right end of the camshaft 161r projects through the side wall of the clutch gear case 28. A driven sprocket 162r is mounted on the projecting right end of the camshaft 161r. As previously mentioned, the drive sprocket 52 is fixed to the right end of the cap 51 mounted on the right end of the crankshaft 21 projecting rightward from the opening of the clutch gear case 28. Although not shown, a similar driven sprocket 162f is mounted on the camshaft 161f for the front bank. An endless chain 163 is wrapped among the drive sprocket 52, the front driven sprocket 162f, and the rear driven sprocket 162r. The driven sprocket 162r has twice the number of teeth of the drive sprocket 52. Accordingly, the rotation of the crankshaft 21 is transmitted from the drive sprocket 52 through the chain 163 to the driven sprocket 162r, so that the camshaft 161r is rotated at a speed half that of the crankshaft 21.

As shown in FIG. 4, the camshaft 161r is formed with a pair of high-speed and low-speed cams for the intake valve 101r and a pair of high-speed and low-speed cams for the exhaust valve 102r. The rollers of four rocker arms 164r (two high-speed rocker arms 164r and two low-speed rocker arms 164r) are in abutment against the four cams of the camshaft 161r, respectively. The four rocker arms 164r are pivotably supported to a common rocker arm shaft 165r. Two elastic biasing devices 166r are provided to bias the rollers of the two high-speed rocker arms 164r against the two high-speed cams.

The rocker arm shaft 165r is formed with a hydraulic passage for supplying oil pressure to a link mechanism formed between the high-speed rocker arm 164r and the low-speed rocker arm 164r for each pair. The operation ends of the two low-speed rocker arms 164r receive the lower ends of the intake push rod 153r and the exhaust push rod 158r, respectively.

Accordingly, when no oil pressure is applied to the link mechanism, the high-speed rocker arm 164r and the low-speed rocker arm 164r of each pair are not engaged with each other to pivotally move independently of each other, so that the intake push rod 153r and the exhaust push rod 158r received at their lower ends by the operation ends of the low-speed rocker arms 164r are lifted and lowered according to the low-speed cams. The intake valve 101r and the exhaust valve 102r are operated at the low-speed valve timing.

In contrast, when oil pressure is applied to the link mechanism, the high-speed rocker arm 164r and the low-speed rocker arm 164r of each pair are engaged with each other to pivotally move together, so that the intake push rod 153r and the exhaust push rod 158r are lifted and lowered according to the high-speed cams. The intake valve 101r and the exhaust valve 102r are operated at the high-speed valve timing.

Although not shown, the camshaft 161f for the front bank has a structure similar to that of the camshaft 161r for the rear bank, and is provided with similar members including four rocker arms, a rocker arm shaft, elastic biasing means, a link mechanism, an intake push rod, and an exhaust push rod. When no oil pressure is applied to the link mechanism, the intake valve 101f and the exhaust valve 102f are operated at the low-speed valve timing, whereas when an oil pressure is applied to the link mechanism, the intake valve 101f and the exhaust valve 102f are operated at the high-speed valve timing.

A hydraulic control valve 168 for controlling an oil pressure to the link mechanism is mounted on the side wall of the left crankcase 22 at a position corresponding to a left extension of the front balancer shaft 60 (see FIG. 5). The hydraulic control valve 168 mounted on the left crankcase 22 is covered by the side cover 36 (see FIG. 1).

Figure 8:
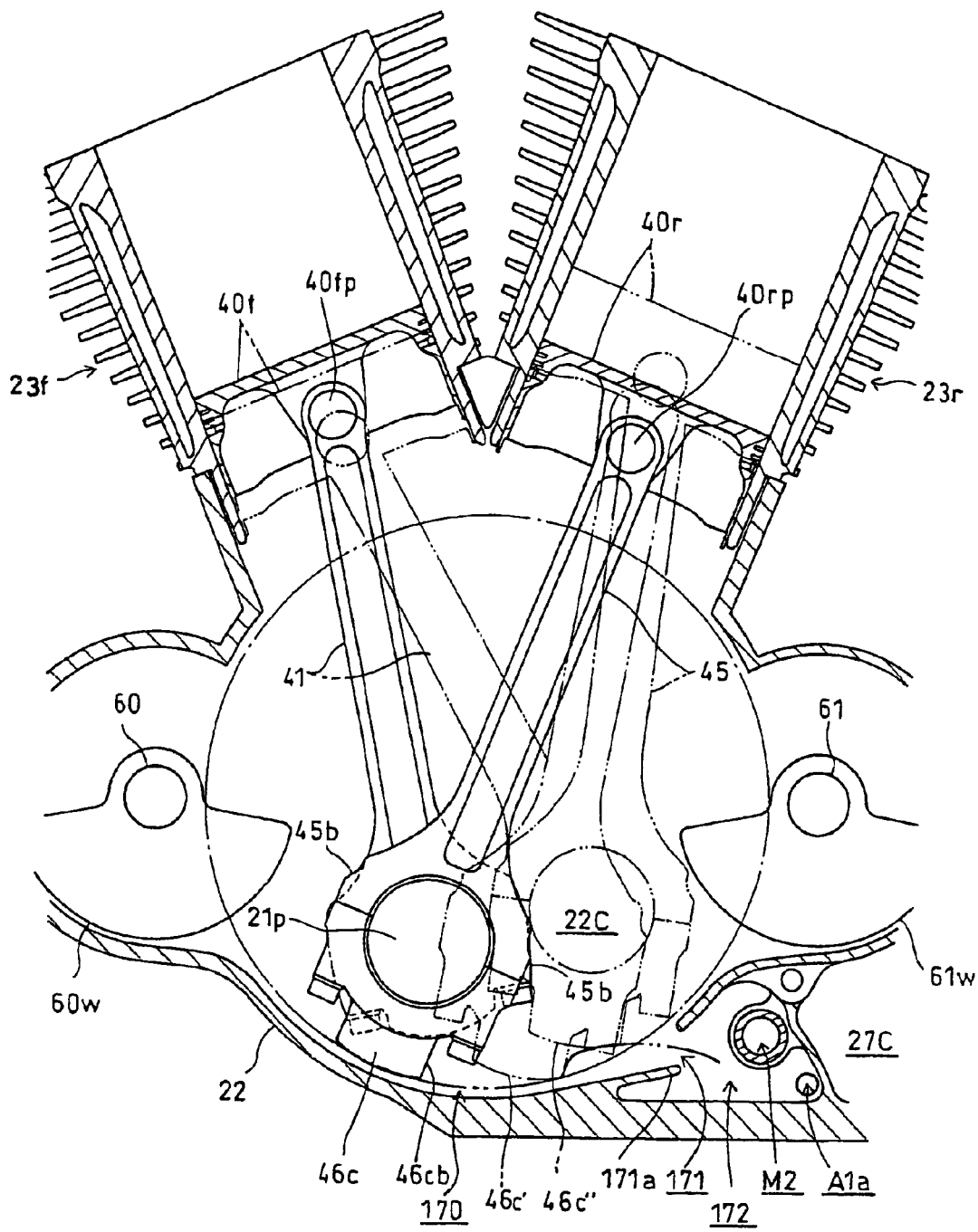
FIG. 8 is a sectional view for illustrating the motion of a rear connecting rod.

A lubricating system will now be described. Referring to FIG. 8, the right and left crank webs 21w of the crankshaft 21 and the connecting portion 46c of the two big ends 45b of the rear connecting rod 45 interposed between the crank webs 21w are turned in the crank chamber 22C. The bottom of the crankcase 22 is formed with an arcuate oil reservoir 170 along the locus described by the outermost point of the connecting portion 46c during its turn. An oil discharge opening 171 is formed adjacent to the oil reservoir 170 on the rear side thereof. The oil discharge opening 171 is in communication with a small oil chamber 172 formed adjacent to the oil reservoir 170 on the rear side thereof.

The oil discharge opening 171 is provided with a discharge guide rib 171a formed by projecting a part of the bottom wall of the oil reservoir 170 into the small oil chamber 172 so as to be inclined slightly upward. An oil outlet A1a is formed at a rear portion of the small oil chamber 172 along the bottom surface thereof The discharge guide rib 171a projecting into the small oil chamber 172 also functions to prevent the return of oil from the small oil chamber 172 to the oil reservoir 170. The oil outlet A1a is an opening of an oil passage A1 that is in communication with an oil pipe A2 located in the transmission chamber 27C. The oil pipe A2 is in communication with a suction oil passage A3 through which the oil is sucked into the crank chamber scavenging pump 86 in the oil pump 85.

Referring to FIG. 8, the motion of the connecting portion 46c of the big ends 45b of the rear connecting rod 45 is shown. Near the bottom dead center of the piston 40r in the rear bank cylinder 23r, the connecting portion 46c starts to be immersed into the oil gathered in the oil reservoir 170. When the connecting portion 46c is moved toward the oil discharge opening 171 in concert with the upward movement of the piston 40r, a flat rear surface 46cb of the connecting portion 46c functions to push the oil gathered in the oil reservoir 170 as shown by two-dot chain lines 46c' and 46c", thus effectively discharging the oil from the oil discharge opening 171 (the condition of the oil surface at the time corresponding to the position 46c' is shown by a two-dot chain line). Accordingly, the oil in the oil reservoir 170 can be efficiently discharged into the small oil chamber 172.

The connecting portion 46c thus functioning to push out the oil in the oil reservoir 170 is preferably formed on the big ends 45b of the rear connecting rod 45 rather than on the big end 41b of the front connecting rod 41, because the connecting rod 46c of the big ends 45b can push the oil toward the oil discharge opening 171 more effectively, thereby discharging the oil from the oil reservoir 170 more efficiently. The rear surface 46cb of the connecting portion 46c may be formed as a concave surface, so as to increase the discharge amount of oil per stroke of the connecting portion 46c.

The big ends 45b of the rear connecting rod 45 have a split structure such that each big end 45b can be split into two parts in a plane perpendicular to the rod axis of the rear connecting rod 45. Accordingly, the pair of semicircular portions 46bc of the connecting rod cap 46 can be integrally formed, so that the connecting rod cap 46 can be easily formed and mounted. The pair of big ends 45b are formed by joining the pair of semicircular portions 46bc of the connecting rod cap 46 to the pair of semicircular rod end portions 45bh and tightening the connecting rod bolts 47 at four positions on the front and rear sides of the connecting portion 46c. Accordingly, the shape of the connecting portion 46c is not limited by the connecting rod bolts 47, and it can be provided easily and flexibly so as to efficiently push out the oil.

As mentioned above, the oil gathered in the oil reservoir 170 of the crank chamber 22C is pushed by the connecting portion 46c of the rear connecting rod 45 and is thereby discharged from the oil discharge opening 171 into the small oil chamber 172. The oil thus discharged into the small oil chamber 172 is sucked from the oil outlet A1a through the oil passage A1, the oil pipe A2, and the oil passage A3 into the crank chamber scavenging pump 86 in the oil pump 85 (see FIG. 2).

A discharge pipe 175 extends upward from the crank chamber scavenging pump 86. The oil discharged from the crank chamber scavenging pump 86 splashes from the discharge pipe 175 toward the main gear train and the counter gear train that mesh with each other in the transmission chamber 27C.

As shown in FIGS. 2 and 5, the bottom wall of the clutch gear case 28 is formed with an oil passage B1 extending rearward from a position below the primary gear 55 to a position behind the rear balancer gear 65. The oil passage B1 has a communication hole B1a opening to the position below the primary gear 55 and communicating with the clutch chamber 28C. The rear end of the oil passage B1 is in communication with a strainer (not shown) provided in the clutch chamber 28C. A suction oil passage is connected through the strainer to the clutch chamber scavenging pump 88 in the oil pump 85 (see FIG. 6). Accordingly, the oil in the clutch chamber 28C is sucked through the oil passage B1 and the strainer into the clutch chamber scavenging pump 88 by the operation thereof.

As shown in FIGS. 2 and 6, the oil gathered at the bottom of the transmission chamber 27C is sucked through a strainer 185 and a suction pipe C1 into the feed pump 87 in the oil pump 85 by the operation thereof. The oil from the feed pump 87 is discharged into a discharge oil passage C2. The discharge oil passage C2 is connected to an oil inlet of an oil filter 186 mounted on the transmission case 27 at its rear lower portion. The oil from the oil filter 186 is fed into a main gallery M.

The main gallery M includes a main oil passage M1 extending frontward from the oil filter 186, a main oil passage M2 expanded into the small oil chamber 172 adjacent to the crank chamber 22C on the rear side thereof and extending laterally so as to communicate with the main oil passage M1, and a pair of main oil passages M3 bent from the right and left ends of the main passage M2 and extending frontward along the side walls of the right and left crankcases 22. A pair of oil passages D1 are branched from the main oil passages M3 at positions below right and left journal portions of the crankshaft 21 (see FIGS. 2 and 5).

Referring to FIG. 2, the front end of the left main oil passage M3 that extends frontward in the left crankcase 22 so as to pass through the branch point with respect to the left oil passage D1 is in communication with an oil passage E1 that extends upward and is bent frontward to reach the hydraulic control valve 168. An oil passage F1 is formed in the left crankcase 22 so as to extend rightward from the hydraulic control valve 168 toward the front balancer shaft 60 (see FIG. 5). An oil passage E2 is also formed in the left crankcase 22 so as to extend upward from the hydraulic control valve 168 (see FIG. 2). The hydraulic control valve 168 can switch the communication of the oil passage E1 with either the oil passage E2 which extends upwardly or the oil passage F1 which leads to the front balancer shaft 60.

The oil passage E2 is bent rightward at an upper end thereof to communicate with an oil passage E3 that extends laterally to the right crankcase 22. As shown in FIG. 2, the oil passage E3 is in communication with an oil passage E4 extending rearward horizontally in the side wall of the right crankcase 22. The oil passage E4 is in communication with an oil passage E5 that extends obliquely upward to the rear side and communicates with the hydraulic passage formed in the rear rocker arm shaft 165r of the valve operating cam mechanism 160. Furthermore, an oil passage E6 branches from the oil passage E5 so as to extend obliquely upward to the front side and communicates with the hydraulic passage formed in the front rocker arm shaft 165f.

The hydraulic passages in the front and rear rocker arm shafts 165f and 165r are in communication with the link mechanisms for the rocker arms 164f and 164r, respectively, to apply oil pressure to the link mechanisms. Accordingly, when the hydraulic control valve 168 communicates between the oil passage E1 and the oil passage E2, the oil pressure is applied to the link mechanisms, so that the intake valves 101f and 101r and the exhaust valves 102f and 102r are operated at the high-speed valve timing. Conversely, when the hydraulic control valve 168 communicates between the oil passage E1 and the oil passage F1, no oil pressure is applied to the link mechanisms, so that the intake valves 101f and 101r and the exhaust valves 102f and 102r are operated at the low-speed valve timing.

As shown in FIG. 5, the oil flowing into the oil passage F1 is supplied to the left bearing 62 for the front balancer shaft 60, and is discharged through the center hole 60a of the front balancer shaft 60 into the crank chamber 22C at the right end opening of the center hole 60a. Thus, the hydraulic control valve 168 is located on the left side surface of the left crankcase 22 at a left position of the front balancer shaft 60, which is at the same level as that of the crankshaft 21. That is, the hydraulic control valve 168 is located apart from the cylinders 23f and 23r, so that the hydraulic control valve 168 is not directly influenced by the heat from the cylinders 23f and 23r. Accordingly, the hydraulic control valve 168 can be operated properly to thereby switch the valve timing accurately.

Furthermore, the exhaust pipe 115 connected to the exhaust port 104f pointed obliquely rightward in the front cylinder head 24f extends downward and further extends rearward along the right side surface of the right crankcase 22. To the contrary, the hydraulic control valve 168 is provided on the left side surface of the left crankcase 22, so that the hydraulic control valve 168 is hardly influenced by the heat from the exhaust pipe 115.

The front balancer shaft 60 can be lubricated by utilizing the oil supplied to the hydraulic control valve 168. The oil flowing from the hydraulic control valve 168 can be discharged into the crank chamber 22C through the center hole 60a of the front balancer shaft 60 as an oil passage. Accordingly, it is not necessary to provide any dedicated oil passage and oil recovery passage for lubrication of the balancer shaft, thereby simplifying a lubricating oil path.

Furthermore, the valve operating cam mechanism 160 using an OHV-type valve train is provided on the right crankcase 22. Accordingly, the total length of the oil passages E2, E3, E4, and E5 from the hydraulic control valve 168 provided on the left crankcase 22 to the link mechanism for applying an oil pressure to the valve operating cam mechanism 160 can be reduced, thereby further simplifying the lubricating oil path.

Furthermore, the hydraulic control valve 168 is mounted on the side wall of the left crankcase 22 and is covered by the side cover 36. Accordingly, the hydraulic control valve 168 is not exposed to the outside of the internal combustion engine, so that the external appearance of the internal combustion engine can be kept in a good condition.

While the single rear connecting rod 45 connected at its small end to the piston pin 40rp of the piston 40r reciprocating in the rear bank cylinder 23r has a bifurcated big end in this preferred embodiment, two rear connecting rods may be provided instead.

Figure 13:
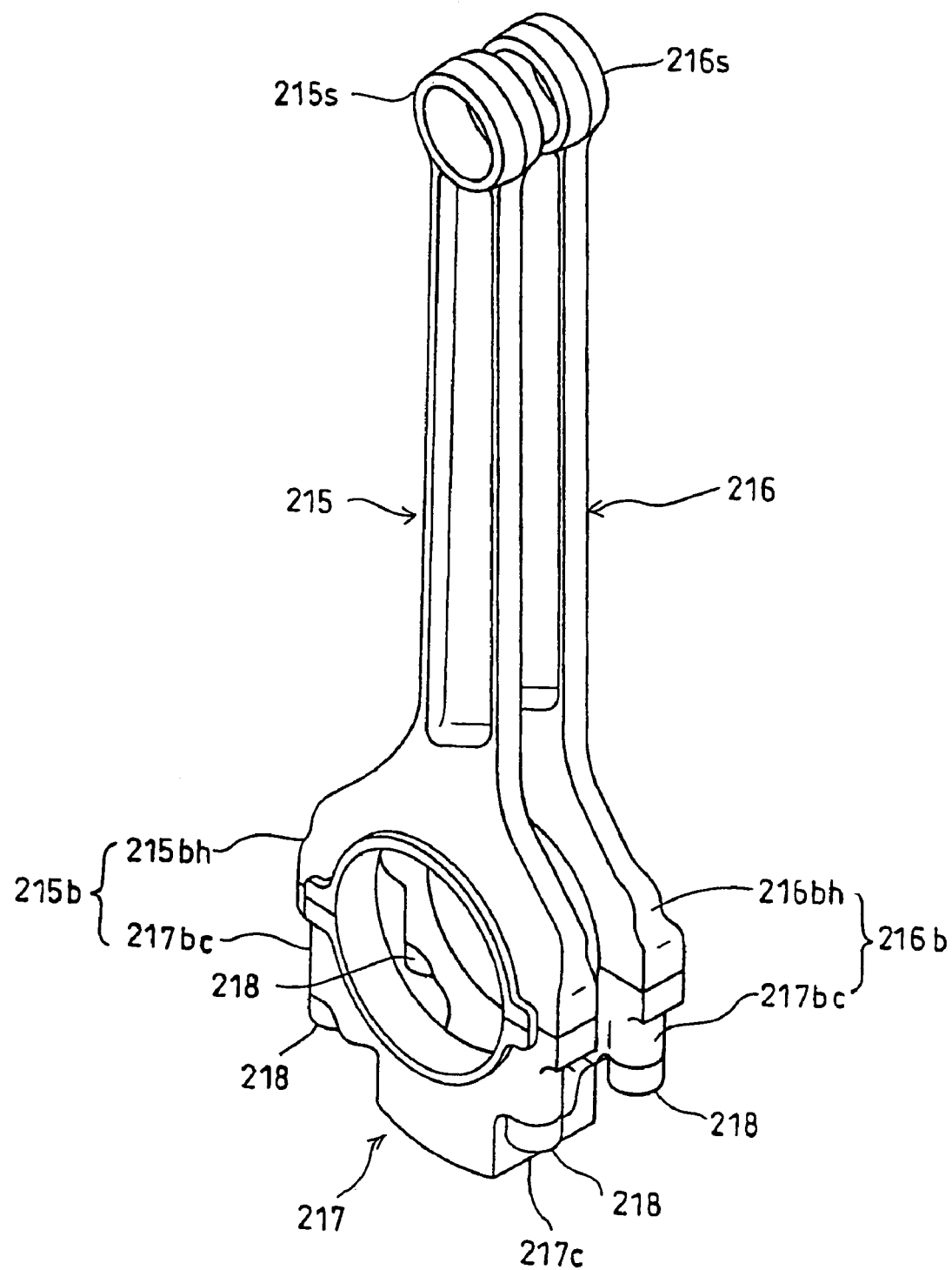
FIG. 13 is a perspective view of a rear connecting rod in an internal combustion engine according to another preferred embodiment of the present invention.

FIG. 13 shows such another preferred embodiment, wherein a pair of rear connecting rods 215 and 216 symmetrical in shape respectively have a pair of small ends 215s and 216s supported to the common piston pin 40rp and a pair of big ends 215b and 216b each splittable in a plane perpendicular to the rod axis of each rear connecting rod. The pair of big ends 215b and 216b of the rear connecting rods 215 and 216 are respectively composed of a pair of semicircular rod end portions 215bh and 216bh opposed to each other and a pair of semicircular portions 217bc joined to the rod end portions 215bh and 216bh by means of four connecting rod bolts 218. The pair of semicircular portions 217bc project radially outward (in a centrifugal direction) at their central portions, and these projecting portions are connected by a connecting portion 217c, thus forming an integral connecting rod cap 217. The connecting rod cap 217 itself has substantially the same shape as that of the connecting rod cap 46 shown in FIG. 10, so the connecting rod cap 46 may be utilized.

Although not shown, a front connecting rod used in this preferred embodiment is the same as the front connecting rod 41. A connecting rod cap of a big end thereof is secured to a rod end portion by means of two connecting rod bolts as in FIG. 9.

The rear connecting rods 215 and 216 having the connecting portion 217c perform the same motion as that of the rear connecting rod 45 shown in FIG. 8. That is, the rear surface of the connecting portion 217c functions to effectively push out the oil gathered in the oil reservoir 170 toward the oil discharge opening 171. Accordingly, the oil in the oil reservoir 170 can be efficiently discharged from the oil discharge opening 171 into the small oil chamber 172, and the lubricating oil can be smoothly circulated regardless of an operating condition.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine comprising:
    a valve operation characteristics changing mechanism that changes the operation characteristics of at least one of an intake valve and an exhaust valve; and
    a hydraulic control valve for a valve train for controlling the pressure of a hydraulic fluid supplied to said valve operation characteristics changing mechanism,
    wherein said hydraulic control valve is located on a first side surface of a crankcase that supports and covers a crankshaft at a position below a cylinder, and
    wherein said hydraulic control valve is located on the first side surface of the crankcase that is located apart from the cylinder so that the hydraulic control valve is not directly influenced by heat from the cylinder.

2. The internal combustion engine according to claim 1, wherein said hydraulic control valve is located on said first side surface of said crankcase opposite to a second side surface of said crankcase along which an exhaust pipe is provided.

3. The internal combustion engine according to claim 2, wherein a rotating shaft that cooperates with said crankshaft is provided in said crankcase, and said hydraulic control valve is located on said first side surface of said crankcase at a position lying on the axis of said rotating shaft.

4. The internal combustion engine according to claim 3, wherein oil discharged from said hydraulic control valve is returned through an axial hole formed in said rotating shaft into said crankcase.

5. The internal combustion engine according to claim 3, wherein said internal combustion engine is an OHV type internal combustion engine, and said valve operation characteristics changing mechanism is provided on a second side surface of said crankcase.

6. The internal combustion engine according to claim 2, wherein said internal combustion engine is an OHV type internal combustion engine, and said valve operation characteristics changing mechanism is provided on a second side surface of said crankcase.

7. An internal combustion engine comprising:
a valve operation characteristics changing mechanism that changes the operation characteristics of at least one of an intake valve and an exhaust valve; and
a hydraulic control valve for a valve train for controlling the pressure of a hydraulic fluid supplied to said valve operation characteristics changing mechanism,
wherein said hydraulic control valve is located on a first side surface of a crankcase that supports and covers a crankshaft at a position below a cylinder, and
wherein a rotating shaft that cooperates with said crankshaft is provided in said crankcase, and said hydraulic control valve is located on said first side surface of said crankcase at a position lying on the axis of said rotating shaft.

8. The internal combustion engine according to claim 7, wherein oil discharged from said hydraulic control valve is returned through an axial hole formed in said rotating shaft into said crankcase.

9. The internal combustion engine according to claim 7, wherein said internal combustion engine is an OHV type internal combustion engine, and said valve operation characteristics changing mechanism is provided on a second side surface of said crankcase.

10. An internal combustion engine comprising:
a valve operation characteristics changing mechanism that changes the operation characteristics of at least one of an intake valve and an exhaust valve; and
a hydraulic control valve for a valve train for controlling the pressure of a hydraulic fluid supplied to said valve operation characteristics changing mechanism,
wherein said hydraulic control valve is located on a first side surface of a crankcase that supports and covers a crankshaft at a position below a cylinder, and
wherein said internal combustion engine is an OHV type internal combustion engine, and said valve operation characteristics changing mechanism is provided on a second side surface of said crankcase.

11. An internal combustion engine comprising:
a pair of high speed rocker arms and a pair of low speed rocker arms, said pair of high speed rocker arms being operable to control an intake valve and an exhaust valve at a high-speed valve timing, and said pair of low speed rocker arms being operable to control the intake valve and the exhaust valve at a low-speed valve timing;
a link mechanism being operable to engage said pair of high speed rocker arms or said pair of low speed rocker arms; and
a hydraulic control valve controlling the pressure of a hydraulic fluid supplied to said link mechanism,
wherein said hydraulic control valve is located on a first side surface of a crankcase, and
wherein said hydraulic control valve is located on the first side surface of the crankcase that is located apart from a cylinder so that the hydraulic control valve is not directly influenced by heat from the cylinder.

12. The internal combustion engine according to claim 11, wherein said hydraulic control valve is located on said first side surface of said crankcase opposite to a second side surface of said crankcase along which an exhaust pipe is provided.

13. The internal combustion engine according to claim 12, wherein a rotating shaft that cooperates with said crankshaft is provided in said crankcase, and said hydraulic control valve is located on said first side surface of said crankcase at a position lying on the axis of said rotating shaft.

14. The internal combustion engine according to claim 13, wherein oil discharged from said hydraulic control valve is returned through an axial hole formed in said rotating shaft into said crankcase.

15. The internal combustion engine according to claim 13, wherein said internal combustion engine is an OHV type internal combustion engine, and said valve operation characteristics changing mechanism is provided on a second side surface of said crankcase.

16. The internal combustion engine according to claim 12, wherein said internal combustion engine is an OHV type internal combustion engine, and said valve operation characteristics changing mechanism is provided on a second side surface of said crankcase.

17. An internal combustion engine comprising:
a pair of high speed rocker arms and a pair of low speed rocker arms, said pair of high speed rocker arms being operable to control an intake valve and an exhaust valve at a high-speed valve timing, and said pair of low speed rocker arms being operable to control the intake valve and the exhaust valve at a low-speed valve timing;
a link mechanism being operable to engage said pair of high speed rocker arms or said pair of low speed rocker arms; and
a hydraulic control valve controlling the pressure of a hydraulic fluid supplied to said link mechanism,
wherein said hydraulic control valve is located on a first side surface of a crankcase, and
wherein a rotating shaft that cooperates with said crankshaft is provided in said crankcase, and said hydraulic control valve is located on said first side surface of said crankcase at a position lying on the axis of said rotating shaft.

18. The internal combustion engine according to claim 17, wherein oil discharged from said hydraulic control valve is returned through an axial hole formed in said rotating shaft into said crankcase.

19. The internal combustion engine according to claim 17, wherein said internal combustion engine is an OHV type internal combustion engine, and said valve operation characteristics changing mechanism is provided on a second side surface of said crankcase.

20. An internal combustion engine comprising:
a pair of high speed rocker arms and a pair of low speed rocker arms, said pair of high speed rocker arms being operable to control an intake valve and an exhaust valve at a high-speed valve timing, and said pair of low speed rocker arms being operable to control the intake valve and the exhaust valve at a low-speed valve timing;
a link mechanism being operable to engage said pair of high speed rocker arms or said pair of low speed rocker arms; and
a hydraulic control valve controlling the pressure of a hydraulic fluid supplied to said link mechanism,
wherein said hydraulic control valve is located on a first side surface of a crankcase, and
wherein said internal combustion engine is an OHV type internal combustion engine, and said valve operation characteristics changing mechanism is provided on a second side surface of said crankcase.

* * * * *